(12) United States Patent
Davey, Jr.

(10) Patent No.: US 10,981,459 B1
(45) Date of Patent: Apr. 20, 2021

(54) CHARGING SYSTEM FOR ELECTRIC VEHICLES IN MOTION

(71) Applicant: Walter Thomas Davey, Jr., Newport Coast, CA (US)

(72) Inventor: Walter Thomas Davey, Jr., Newport Coast, CA (US)

(*) Notice: Subject to any disclaimer, the term of this patent is extended or adjusted under 35 U.S.C. 154(b) by 0 days.

(21) Appl. No.: 17/083,676

(22) Filed: Oct. 29, 2020

(51) Int. Cl.
| | | |
|---|---|---|
| *B60L 53/16* | (2019.01) | |
| *B60L 53/35* | (2019.01) | |
| *B60L 53/51* | (2019.01) | |
| *B60L 53/53* | (2019.01) | |

(52) U.S. Cl.
CPC ............ *B60L 53/16* (2019.02); *B60L 53/35* (2019.02); *B60L 53/51* (2019.02); *B60L 53/53* (2019.02)

(58) Field of Classification Search
CPC ...................................................... B60L 53/16
USPC ............................................................ 320/109
See application file for complete search history.

(56) References Cited

U.S. PATENT DOCUMENTS

| | | |
|---|---|---|
| 729,137 A | 5/1903 | Connett |
| 1,519,887 A | 12/1924 | Uffert |
| 3,786,762 A | 1/1974 | Corkum et al. |
| 4,129,203 A | 12/1978 | Berman |
| 5,595,271 A | 1/1997 | Tseng |
| 5,680,122 A | 10/1997 | Mio |
| 8,307,967 B2* | 11/2012 | Patwardhan ............ B60L 53/14 191/2 |
| 9,162,577 B2* | 10/2015 | Asplund ................ B60M 7/003 |
| 2011/0266108 A1 | 11/2011 | Kitaguchi |
| 2013/0018766 A1 | 1/2013 | Christman |
| 2013/0020164 A1* | 1/2013 | Asplund .................. B60L 5/40 191/29 R |
| 2015/0041273 A1* | 2/2015 | Klein ....................... B60L 5/40 191/22 C |
| 2016/0031337 A1 | 2/2016 | Li et al. |
| 2016/0114687 A1 | 4/2016 | Ichikawa et al. |
| 2016/0280087 A1 | 9/2016 | Tajima et al. |
| 2017/0346348 A1 | 11/2017 | Lethellier et al. |
| 2019/0193566 A1 | 6/2019 | Gerfast |
| 2019/0202295 A1* | 7/2019 | Engstrom ................ B60L 5/38 |
| 2019/0210467 A1* | 7/2019 | Ohman .................... B60L 5/04 |
| 2019/0263267 A1* | 8/2019 | Ohman .................... B60L 5/18 |
| 2019/0389497 A1 | 12/2019 | Golpe et al. |

FOREIGN PATENT DOCUMENTS

| | | |
|---|---|---|
| JP | 48-052207 | 7/1973 |
| JP | S51-43243 | 11/1976 |
| WO | 2011142421 A1 | 11/2011 |

OTHER PUBLICATIONS

Office Action dated Dec. 4, 2020, from U.S. Appl. No. 17/082,423, 15 sheets.
Jason Dorrier, "Korean Road Wirelessly Charges New Electric Buses", dated Aug. 25, 2013, 4 sheets.

* cited by examiner

Primary Examiner — Jerry D Robbins
(74) Attorney, Agent, or Firm — Katten Muchin Rosenman LLP

(57) ABSTRACT

Disclosed herein is a charging system for electric vehicles while in motion. A retractable power charger coupled to an electric vehicle has a blade extendable between a retracted and extended position. The tapered sides of the blade contact rails in a trench when the blade is in the extended position and provide power for charging the electric vehicle while in motion. The blade can be automatically extended by a sensing system (e.g., magnetic) or by user actuation.

16 Claims, 14 Drawing Sheets

CHARGING SYSTEM FOR ELECTRIC VEHICLES IN MOTION

FIELD OF THE INVENTION

The present invention relates to a system for charging electric vehicles while in motion. More particularly, the present invention relates to a retractable power charger attached to an electric vehicle configured to interface with an electric source embedded in a lane of a road.

BACKGROUND

Large city mass transit systems use a third rail to supply power for electric motors to drive the trains. Early, and current, electric transportation systems employ overhead wires to provide motive power via a long arm reaching from the top of the trolley or bus to the power cable above. However, none of these systems for powering a vehicle while in motion is suitable for an electric vehicle on a road.

Additionally, despite the recent surge in the popularity of electric vehicles, charging stations are often located in dense urban centers, making trips beyond the range of the electric vehicles difficult and cumbersome. This makes electric vehicles unsuitable for long trips and requires careful planning by the driver. Accordingly, there exists a need for a system for charging electric vehicles while in motion that can easily be introduced to existing roads and highways. Further, the system must also be robust and able to interface with existing electric vehicles as well as be adaptable to new designs.

SUMMARY

The present invention discloses a charging system for electric vehicles while in motion. A retractable power charger coupled to an electric vehicle has a blade extendable between a retracted and extended position. The tapered sides of the blade contact rails in a trench when the blade is in the extended position and provide power for charging the electric vehicle while in motion. The blade can be automatically extended by a sensing system (e.g., magnetic) or by user actuation.

DETAILED DESCRIPTION

Figure 1:
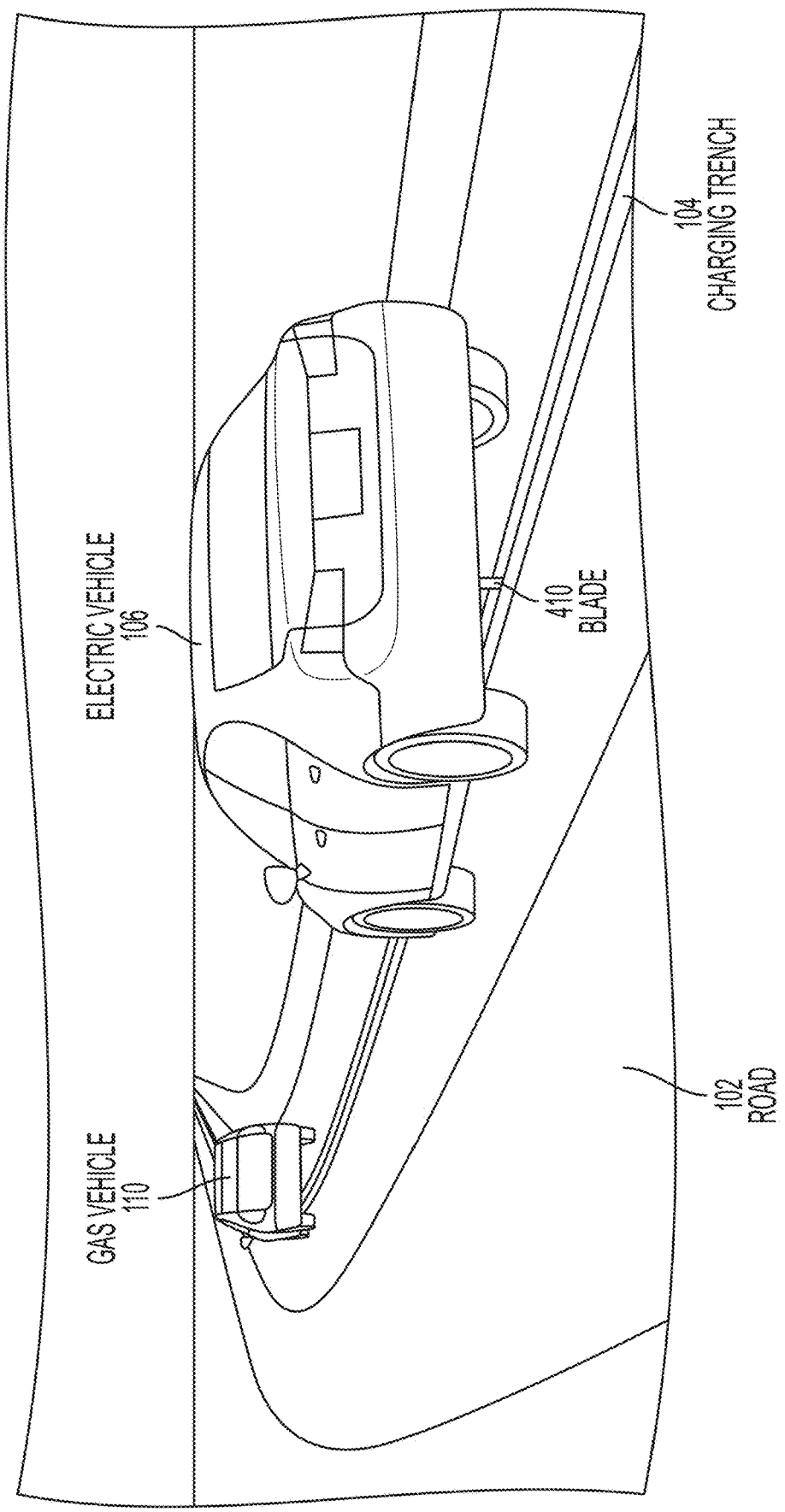
FIG. 1 depicts a perspective view of a road having a charging trench charging an electric vehicle using a retractable power charger according to an embodiment of the invention.

Referring first to FIG. 1, depicted is a perspective view of a road 102 having embedded thereon charging trench 104 and electric vehicle 106 having retractable power transfer blade 410 attached thereto. Of note is that standard gas vehicles 110 can utilize the same road 102 since the charging trench 104 is less than the width of a standard vehicle or motorcycle tire.

As will be explained later, electricity to the charging trench 104 can be supplied by any known means or combination of means (solar power, wind power, etc.). The charging trench 104 also does not need to continue uninterrupted. For example, charging trench 104 may extend for fixed lengths (e.g., forty to seventy miles) which are enough to sufficiently charge electric vehicle 106. Charging trench 104 has the advantage over fast chargers in that multiple electric vehicles 106 can utilize the power supply simultaneously. The only constraint placed on the number of simultaneous electric vehicles 106 that can use charging trench 104 is dictated by the spacing required between the electric vehicles 106 for safety reasons. And, as electric vehicles 106 with automated driving systems become available and more prevalent, even more electric vehicles 106 would be able to utilize charging trench 104 in the future.

To offset the initial cost of charging trenches 104, they may first be installed in heavily trafficked areas or in in remote locations where other means of charging, such as fast chargers, are not readily available. And, because charging trenches 104 can be added to virtually any existing road 102, they can be installed as demand grows.

Access to charging trenches 104 may also be restricted by tolls or other monitoring means which can be used to recoup costs related to the installation, maintenance, and electric costs generated. For example, charging trenches 104 may be placed separated from other lanes of road 102, similar to high-occupancy vehicle (HOV) lanes.

Figure 2:
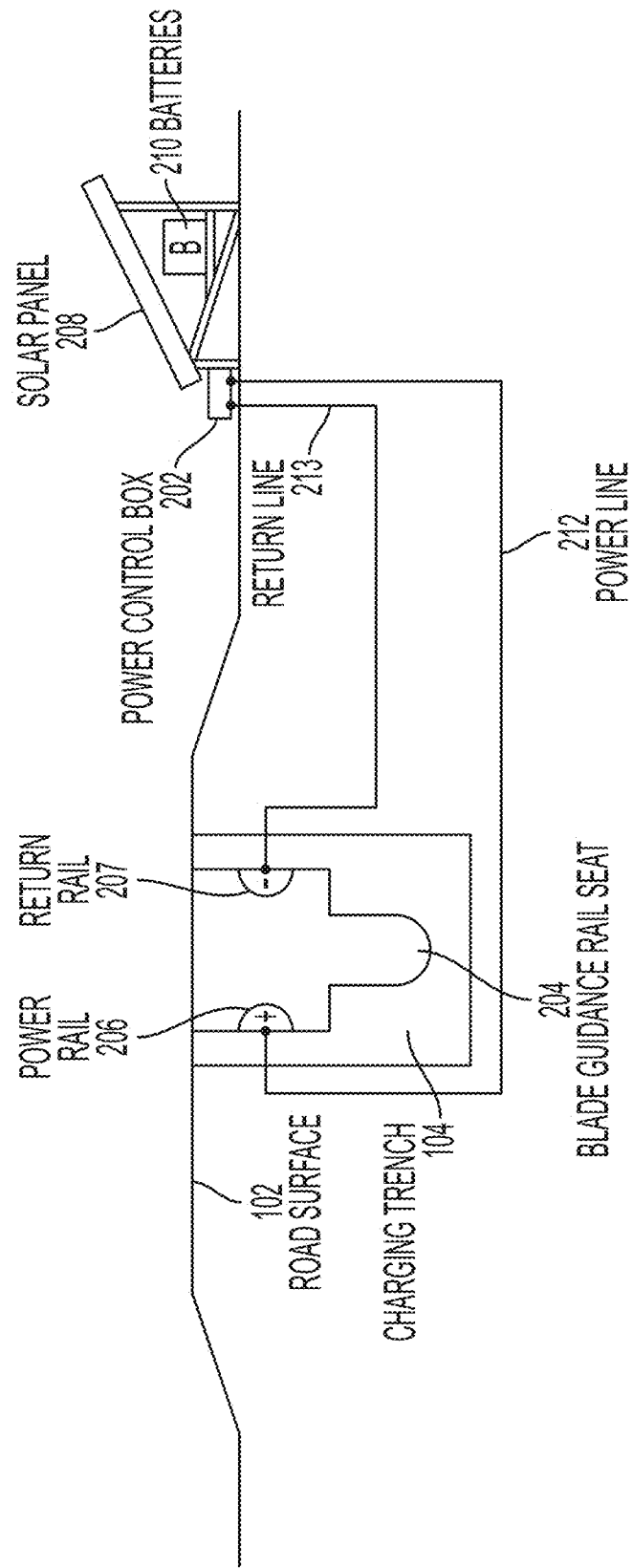
FIG. 2 depicts a schematic showing the connection between the power supply and the trench.

Referring next to FIG. 2 which is a schematic view showing the major components of charging trench 104 and power control box 202. As shown, each charging trench 104 has a top surface which is substantially parallel with a top surface of road 102. Each charging trench 104 comprises blade guidance rail seat 204 and power transfer rails 206 and 207. As will be described in more detail later, rails 206 and 207 interface with retractable power transfer blade 410 to supply power to electric vehicle 106. For example, a first rail 206 supplies a positive DC voltage whereas a second rail 207 supplies a negative DC voltage or a ground connection. Blade guidance rail seat 204 is utilized to center retractable power transfer blade 410 while electric vehicle 106 is in motion.

FIG. 2 further depicts power control box 202 connected to a plurality of solar panels 208 and batteries 210 used to store excess solar energy. It should be noted that power control box 202 can receive power from any power source or any combination of power sources including traditional and renewable energy sources. Power is supplied to power rail 206 via power line 212. The various requirements for connecting control box 202 to rail 206 via power line 212 should be obvious to one of ordinary skill in the art.

Figure 3:
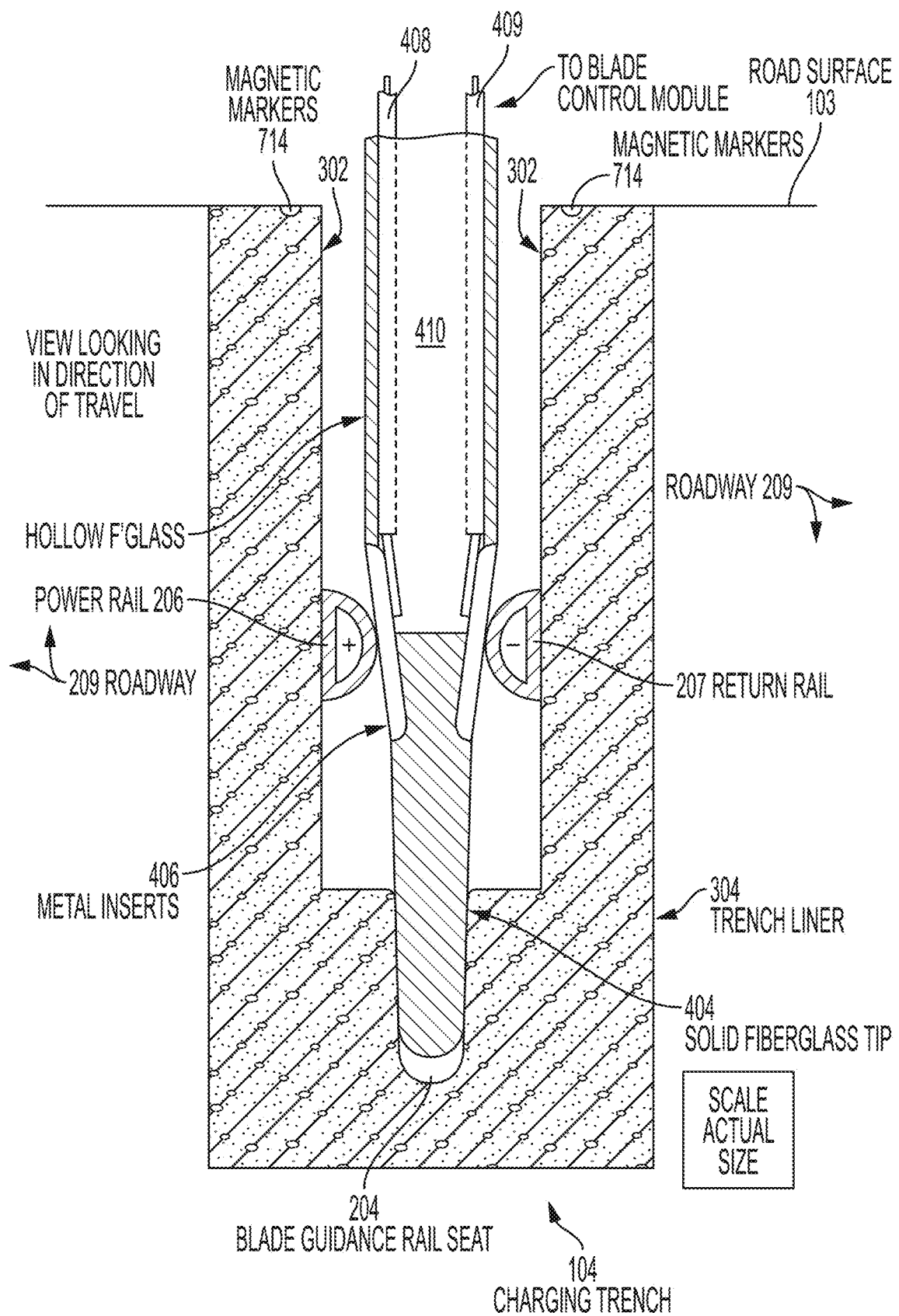
FIG. 3 depicts a cutaway view of the trench in accordance with an embodiment of the invention.

FIG. 3 depicts a cutaway view of charging trench 104 interfacing with retractable power transfer blade 410 in accordance with an embodiment of the invention. Charging trench 104 is preferably U-shaped in cross-section. Opposing sides of charging trench 104 are formed by parallel trench liner sidewalls 302. The bottom of charging trench 104 is formed by the base of trench liner 304. Sidewalls 302 and the base of trench liner 304 can be pre-formed from concrete or an insulated metallic material. Alternatively, each may be constructed from a different material and joined together during installation. For example, it may be advantageous to construct the base of trench liner 304 from pervious concrete to aid in drainage. Or, if the base 304 is formed from a metal, such as stainless steel, drainage openings can be installed periodically along the base of trench line 304.

Blade guidance rail seat 204 is located in the center of the base of trench liner 304. Blade guidance rail seat 204 is preferably formed from a hard plastic or rust-resistant metal. Blade guidance rail seat 204 is preferably U-shaped in cross-section and must follow road grade.

Blade guidance rail seat 204 interfaces with solid fiberglass tip 404 of retractable power transfer blade 410 during charging of electric vehicle 106. Insulated tip 404 of blade 410 is preferably formed from solid fiberglass and has a blunt curved tip as depicted. Insulated tip 404 ensures that metal inserts 406 remain centered and in contact with rails 206 and 207 during charging. Insulated tip 404 may also have some lateral flexibility to help avoid breaking of tip 404 when vehicle 106 is in motion.

Insulated tip 404 is preferably inserted into blade guidance rail seat 204 at approximately a 65-85° angle, but more preferably a 75° angle (trailing electric vehicle 106). When insulated tip 404 is fully inserted into blade guidance rail seat 204, metal inserts 406 mate with rails 206 and 207. This creates three separate points of contact to keep retractable power transfer blade 410 centered as electric vehicle 106 is in motion.

As already discussed, each charging trench 104 comprises rails 206 and 207 which are connected to power lines 212 and 213, respectively, for supplying power to retractable power transfer blade 410. More specifically, each rail 206 and 207 is mounted on sidewall 302 as depicted in FIG. 3. Preferably rails 206 and 207 are located a predetermined distance above base of blade guidance rail seat 204 so that they are electrically isolated from each other even if the bottom of charging trench 104 becomes briefly flooded (e.g., during a flash flood). If rails 206 and 207 become shorted, circuitry within power control box 202 will cut power to rails 206 and 207 until any risk, such as flooding, has passed. For example, a ground fault circuit interpreter (GFCI) device may be employed.

The power rail 206 is connected to the positive DC power supply terminal from power control box 202 and the return rail 207 is connected to the negative or ground DC power supply terminal in power control box 202.

Opposing sides of blade 410 are covered with metal inserts 406 which are electrically isolated from each other by solid fiberglass tip 404. In turn, each metal insert 406 is coupled to a corresponding lead 408.

Using the configuration depicted in FIG. 3, power can safely and reliably be conducted from rails 206 and 207, to leads 408 through metal inserts 406, to electric vehicle 106 for charging. As will now be described, retractable power transfer blade 410 is able to be inserted or retracted from charging trench 104 while electric vehicle 106 is in motion.

Figure 4:
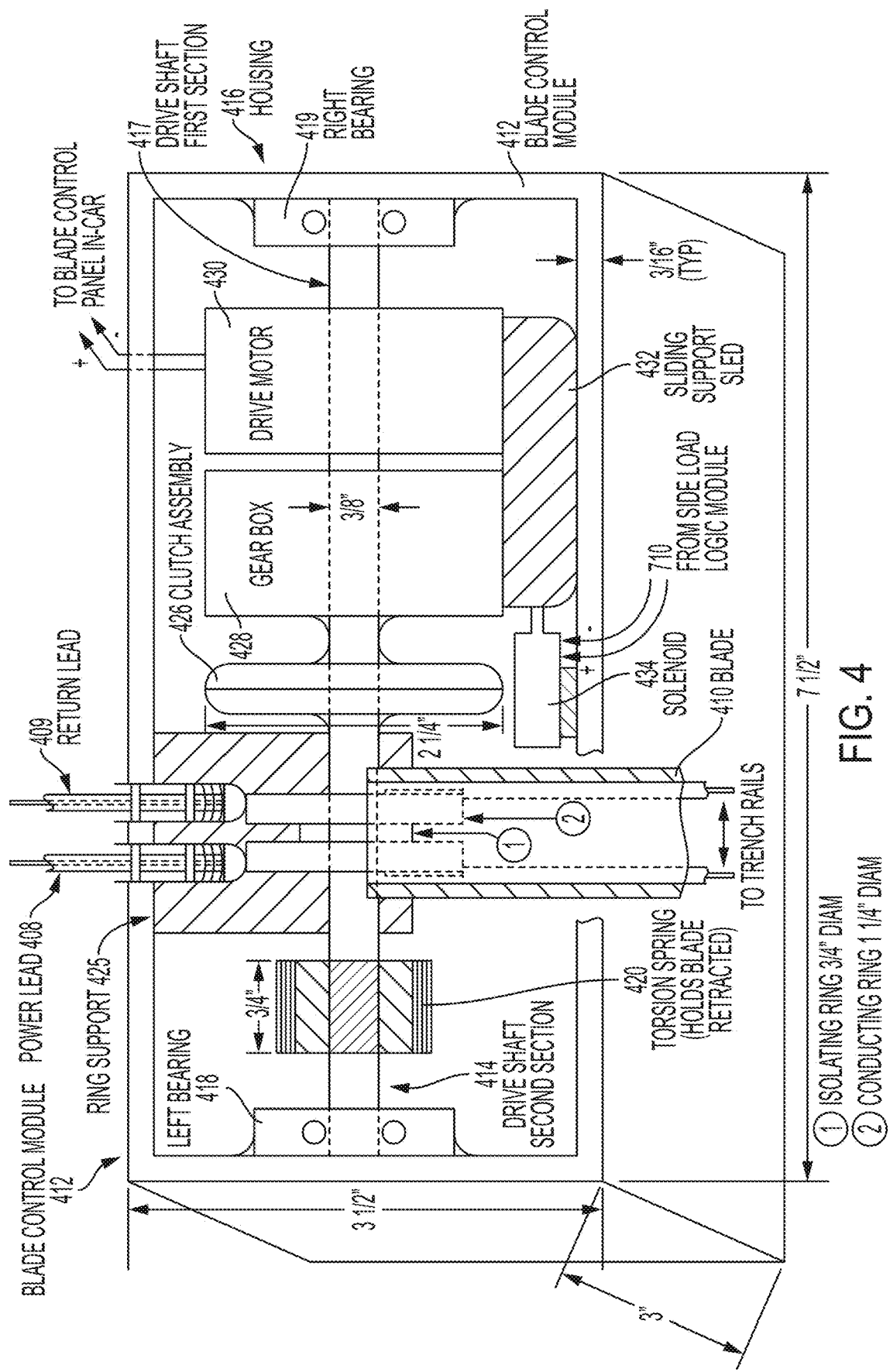
FIG. 4 depicts a view of the blade control module.

FIG. 4 depicts an internal schematic of blade control module 412 which couples retractable power transfer blade 410 to electric vehicle 106. Specifically, blade control module 412 is responsible for the deployment and retraction of retractable power transfer blade 410 by rotating it via drive shaft second section 414 which passes through the upper end of retractable power transfer blade 410 and is firmly attached to it. Blade 410 rotates with drive shaft second section 414 which is anchored by left bearing 418 attached to housing 416 left side wall. Drive shaft second section 414 is made of non-conducting material to provide electrical isolation between the two conducting rings. A drive shaft first section 417 is anchored by right bearing 419 attached to housing 416 right side wall via right bearing 419. The two sections of the total drive shaft interface at the clutch assemble 426. A description of the power transfer method depicted in FIG. 4 is explained in detail in the descriptions of FIG. 12 and FIG. 13.

Spring steel torsion spring 420, which is coupled between housing 416 and drive shaft first section 417, maintains the retractable power transfer blade 410 in the retracted position within blade control module 412 when not being used for charging.

Drive shaft second section 414 is coupled to drive shaft first section 417 via clutch assembly 426. In this configuration, a gear box 428 and a drive motor 430 can be used to simultaneously rotate first section 417 and second section 414. That is, the force applied by drive motor 430 can be used to overcome the force exerted by torsion spring 420 to deploy retractable power transfer blade 410.

Gear box 428 and drive motor 430 are both coupled to sliding support sled 432 which is linearly movable with respect to housing 416 to engage/disengage clutch assembly 426. In normal operation, a solenoid 434 exerts a magnetic retaining force on sliding support sled 432 which maintains clutch assembly 426 in the engaged mode depicted in FIG. 4. However, if power to solenoid 434 is lost due to a power failure, it causes clutch assembly 426 to suddenly spring open through the movement of sliding support sled 432. The disengagement of first section 417 from second section 414 causes torsion spring 420 to immediately retract retractable power transfer blade 410.

All of the elements of blade control module 412 which require power (e.g., the drive motor 430, solenoid 434, etc.) receive power from electric vehicle 106 (through car batteries). The retraction of retractable power transfer blade 410 by blade control module 412 is controlled from within electric vehicle 106 through user action during normal operation.

Figure 5:
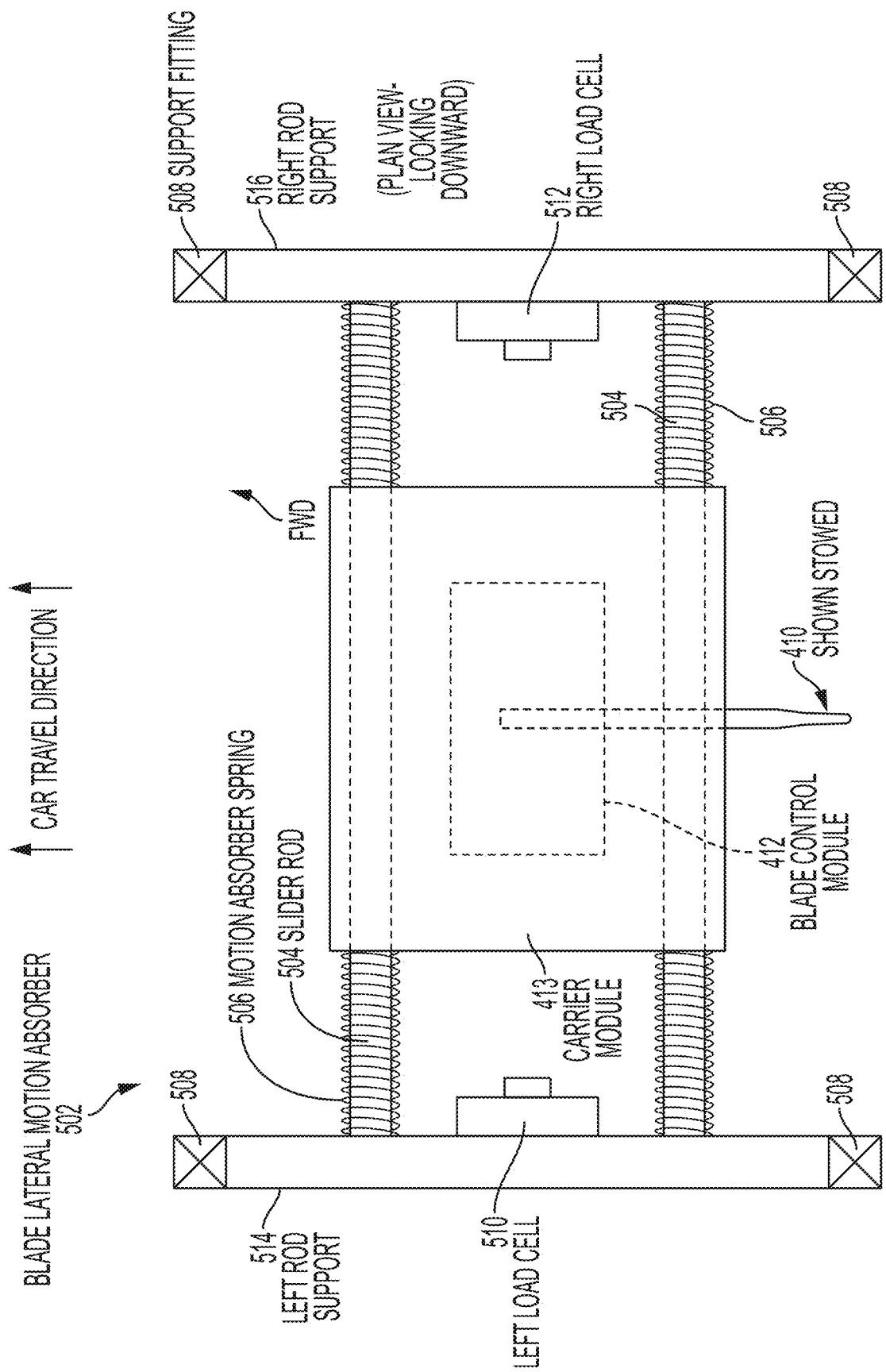
FIG. 5 depicts a view of the blade lateral motion absorber with the blade stowed.
Figure 6:
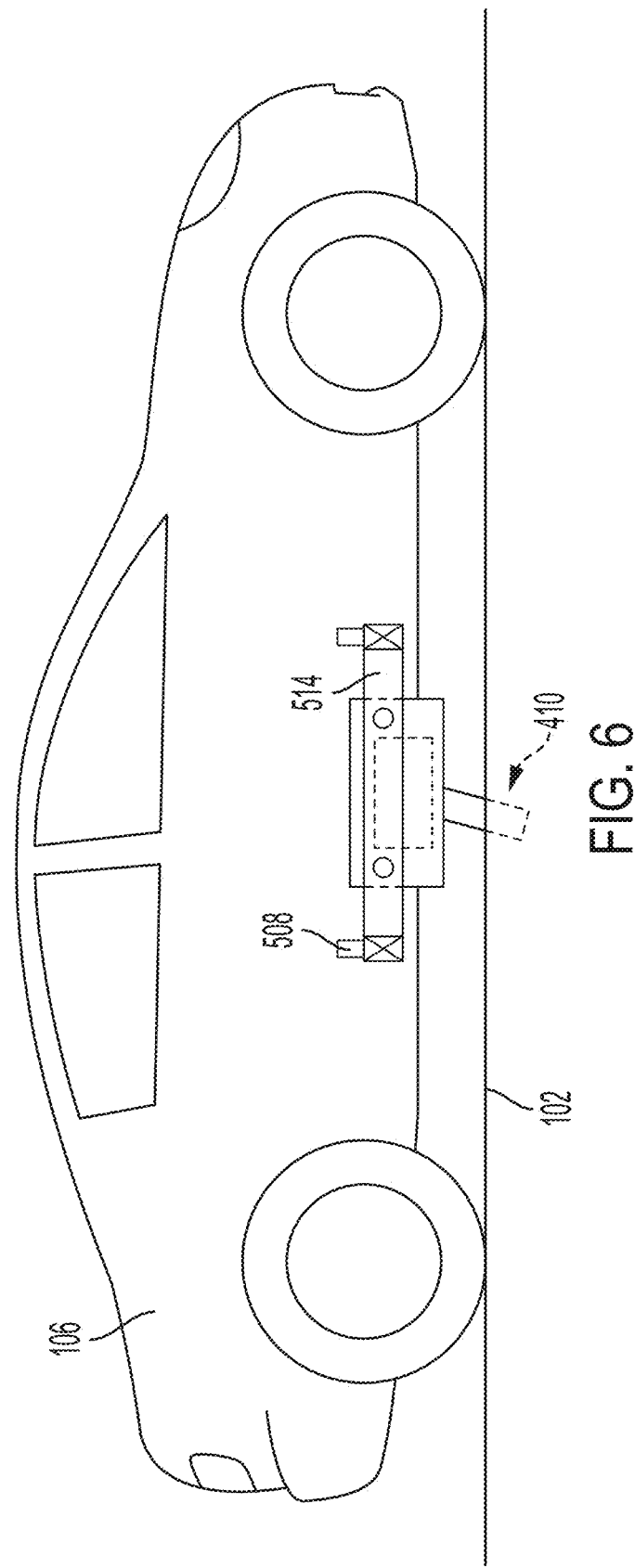
FIG. 6 depicts a view of the blade extended downward to the 75° position.

Referring next to FIG. 5, depicted is a top plan view of blade lateral motion absorber 502. Four support fittings 508 are used to couple motion absorber 502 to electric vehicle 106. These support fittings will be specifically designed to accommodate the various attach points of the multiple models of electric vehicles 106. As shown, rod support left 514 and rod support right 516 are used to couple support fittings 508 to the parallel pair of slider rods 504. Two motion absorber springs 506 are placed around each slider rod 504, as shown in FIG. 5, to center carrier module 413 and dampen excursions of carrier module 413 during minor tracking errors of electric vehicle 106 during charging. Blade control module 412 is mounted on the underside of carrier module 413.

As shown in FIG. 5, left load cell 510 and right load cell 512 are attached to left rod support 514 and right rod support 516, respectively, and measure the load caused by deflection of retractable power transfer blade 410. This deflection is caused by motion absorbing springs 506 having nearly exceeded their compression limits and cause contact between, for example, left load cell 510 and the left edge of carrier module 413. This deflection is measured in pounds and is displayed on FIG. 8 (to be discussed later). If it is determined the lateral deflection load exceeds a predetermined limit, retractable power transfer blade 410 is automatically and immediately retracted.

Figure 7:
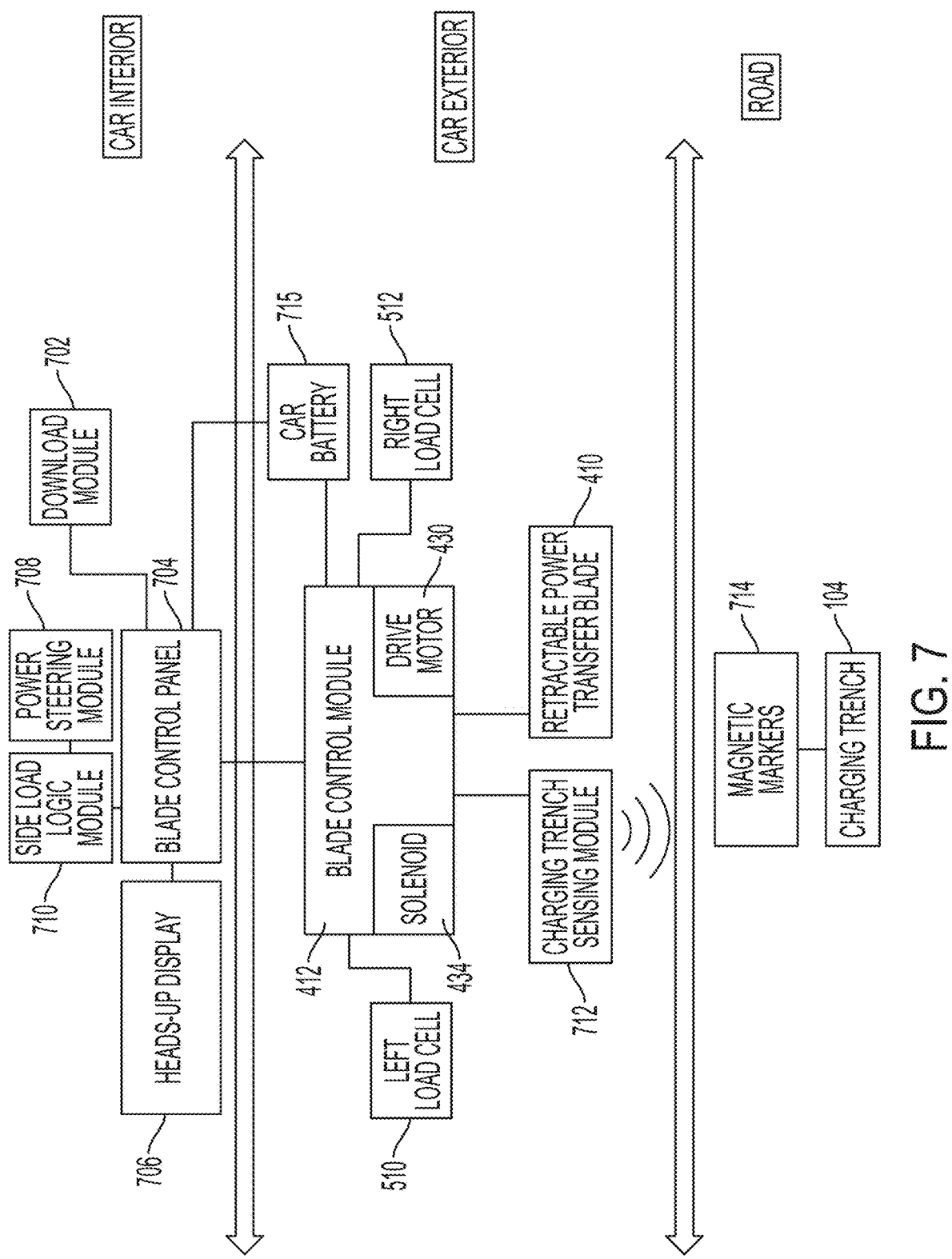
FIG. 7 depicts a schematic diagram of the various components of the charging system.

Referring next to FIG. 7, depicted is a schematic diagram of the overall control system for retractable power transfer blade 410 of the present invention and the relative locations of the described elements relative to electric vehicle 106. The interior of electric vehicle 106 comprises download module 702, blade control panel 704, heads-up display 706, power steering module 708, and side load logic module 710. If the measured force on left load cell 510 or right load cell 512 is below a first force threshold, normal operation is assumed. If the measured force is greater than the first force threshold, but below a second force threshold, the side load logic module 710 will send instructions directly to the power steering module 708 to make course corrections for electric vehicle 106. However, if side load logic module 710 determines that the measured force is greater than the second force threshold, the side load logic module 710 activates solenoid 434 which causes immediate retraction of retractable power transfer blade 410 from charging trench 104.

Figure 8:
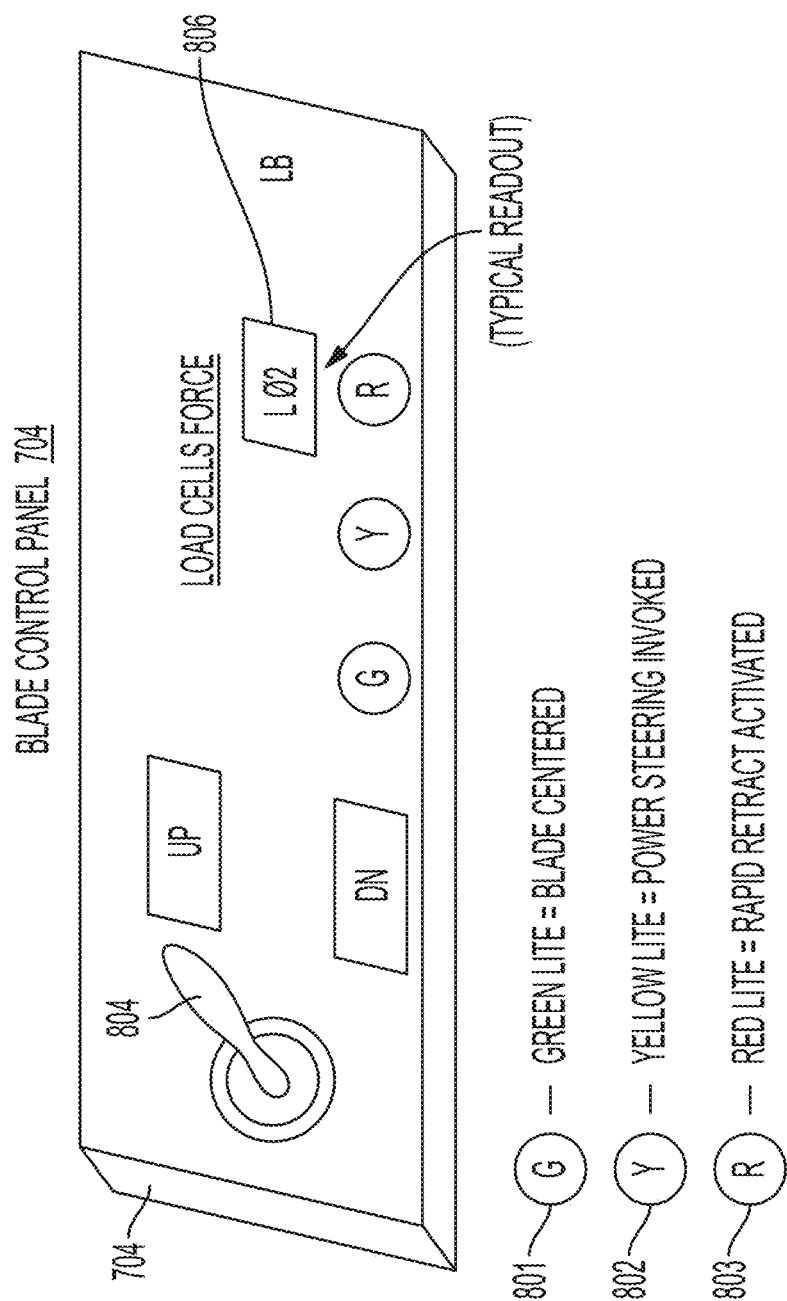
FIG. 8 depicts a view of the in-car blade control panel.

The measured force detected by load cells 510 and 512 may be displayed directly on blade control pane 704 as depicted in FIG. 8. Specifically, a plurality of lights (LEDs) may be used to convey to the user which force level has been detected on load cells 510 or 512. A green light 801 will be used to indicate that the retractable power transfer blade 410 is properly centered and no action is needed by the user. A yellow light 802 will be used to indicate that the measured force is between the first force threshold and the second force threshold, and the power steering module 708 makes a slight correction to the steering. The user will not be alarmed, knowing the reason for the course correction. A red light 803 will illuminate and be used to indicate excessive force on either load cell 510 or 512, and that charging will cease immediately through the rapid retraction of retractable power transfer blade 410.

Blade control panel 704 includes blade control toggle switch 804 which is used to raise or lower retractable power transfer blade 410 under normal conditions. A load cell magnitude window 806 is used to indicate the force currently being exerted on either load cell 510 or 512. The window 806 indicates left or right force in pounds.

Referring back to FIG. 7, blade control module 412 may be outfitted with one or more sensors in the vicinity of the retractable power transfer blade 410 which together form the charging trench sensing module 712. For example, if charging trench 104 is provided with a plurality of magnetic markers 714, charging trench sensing module 712 would be comprised of complementary sensors capable of identifying the markers. As an example, if the markers 714 are spaced on the top sides of the charging trench 104, magnetic field detectors (capable of identifying the presence and center of charging trench 104 using markers 714) would be included in charging trench sensing module 712.

Figure 9:
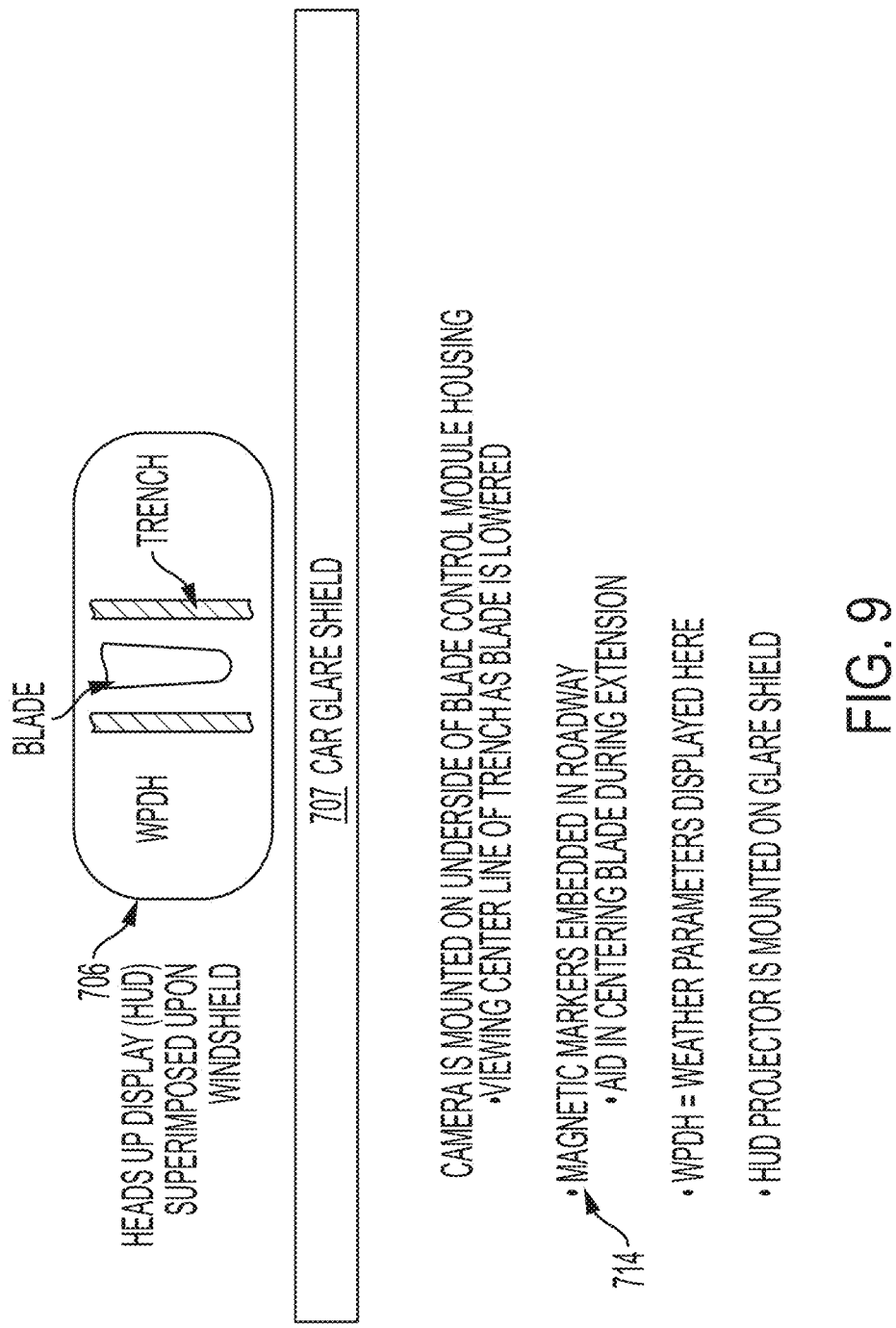
FIG. 9 depicts a view of the heads-up display mounted on the car glare shield and projected onto the windshield.
Figure 10:
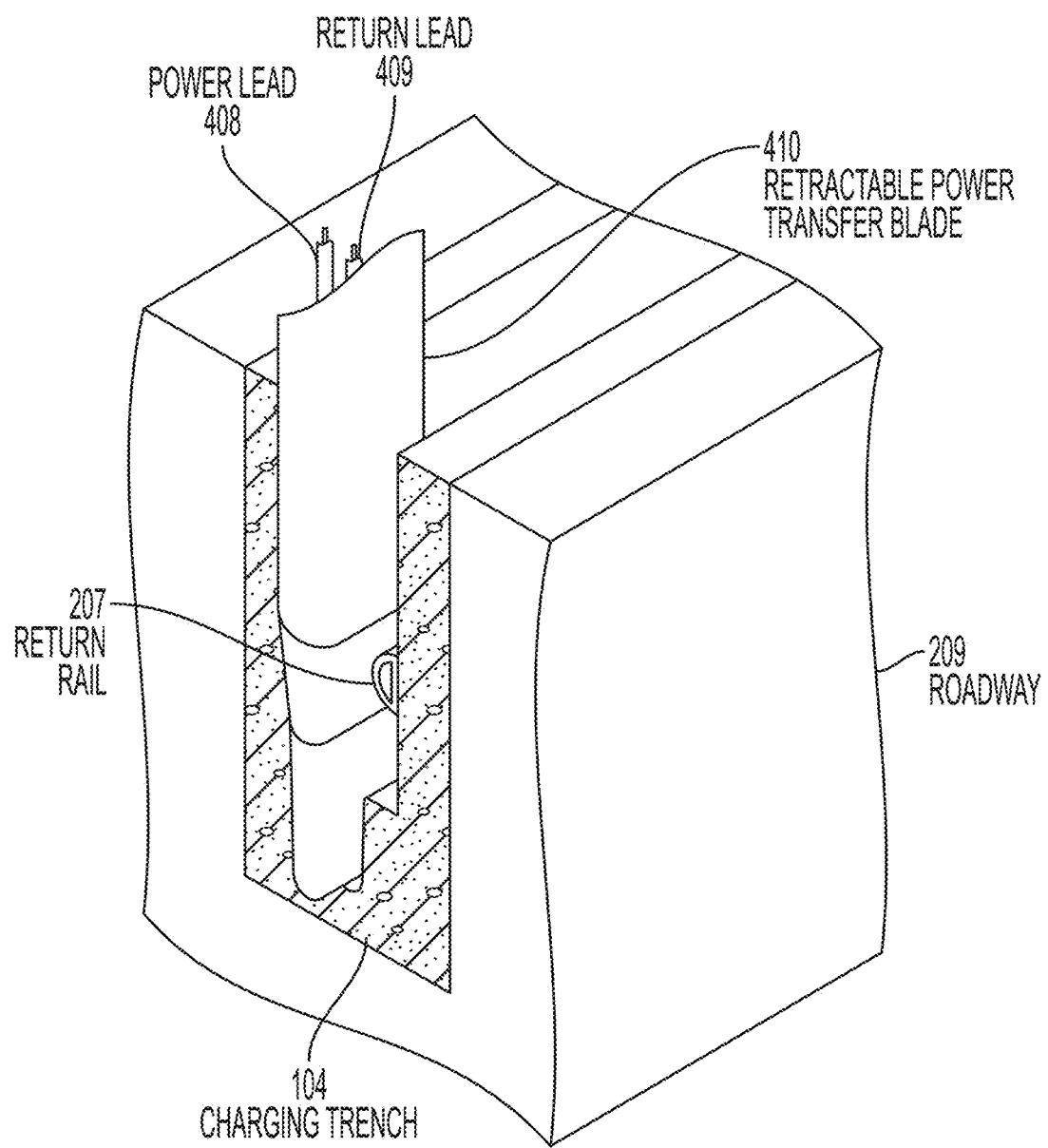
FIG. 10 depicts a perspective view of the blade interfacing with the power supply rails.
Figure 11:
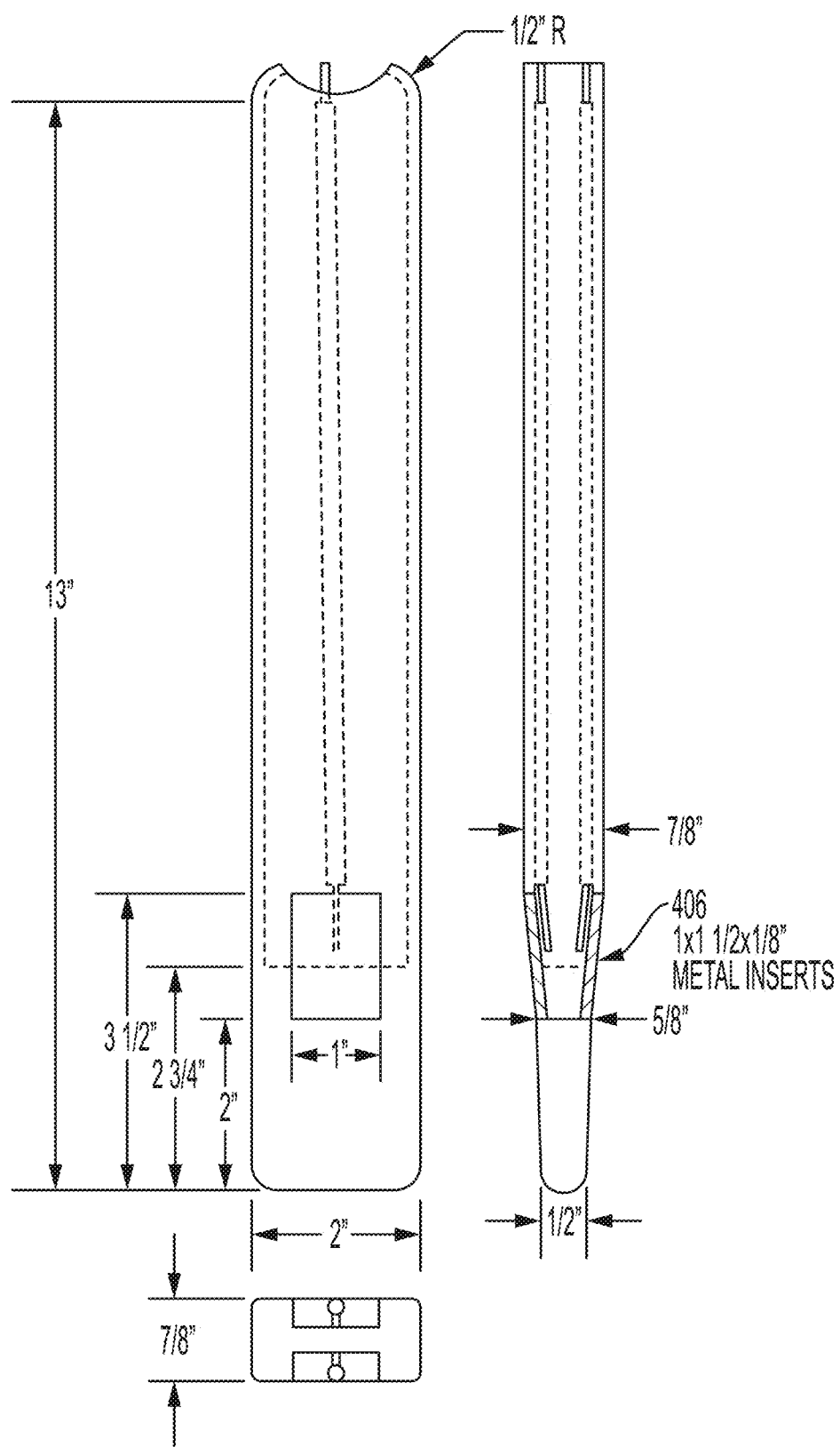
FIG. 11 depicts dimensions of the metal inserts

At a minimum, charging trench sensing module 712 preferably includes one or more digital cameras which allow the user to view the charging trench 104 on heads-up display 706 and to manually deploy retractable power transfer blade 410 using blade control toggle switch 804. An example of a heads-up display 706 is depicted in FIG. 9. Preferably, the heads-up display 706 is superimposed on the windshield of electric vehicle 106 so that the user's eyes are not diverted from the road 102 while driving. The video feed from charging trench sensing module 712 may be fed to the heads-up display 706 once charging trench 104 has been detected. Once the user has verified that the solid fiberglass tip 404 is aligned with charging trench 104, the user uses toggle switch 804 to engage retractable power transfer blade 410 with charging trench 104. This commences the flow of electricity from charging rails 206 and 207 to car battery 715 while electric vehicle 106 is in motion.

Heads-up display 706 may also be used to convey other real-time information to a user downloaded by download module 702 (e.g., over a cellular or RF network). For example, heads-up display 706 may indicate the current weather or traffic data or distance to next charging segment 104.

In another embodiment, software, executed by the processor of blade control panel 704, may cause heads-up display 706 to display indicators, such as directional arrows, to direct the driver so that charging trench 104 is properly aligned with retractable power transfer blade 410.

Once the retractable power transfer blade 410 comes into contact with rails 206 and 207, charging of car battery 715 commences. Blade control panel 704 regulates the flow of electricity to car battery 715 just like a normal charger would. The power supplied to car battery 715 is enough so that electric vehicle 106 can be driven while car battery 715 is also being charged.

The retractable power transfer blade 410 can also be automatically deployed by charging trench sensing module 712 whenever a charging trench 104 is detected and alignment is confirmed. Automatic deployment is especially useful for automated vehicles. In this embodiment, charging trench sensing module 712 first monitors for the presence of charging trench 104 utilizing markers 714. Once charging trench sensing module 712 has verified that charging trench 104 is properly centered below retractable power transfer blade 410, drive motor 430 is actuated, blade 410 is rotated into the trench, and charging begins. The markers 714 can be can be utilized to control power steering module 708 to ensure proper centering over charging trench 104.

Referring again to FIGS. 2 and 3, power control box 202 includes a ground fault circuit interpreter (GFCI) to disconnect the segment of trench 104 in the event of a short circuit. The segment is defined as a section of trench 104, with its own dedicated solar panel 208 system, electrically isolated from the segments ahead of and behind it. The segment is preferably one to five miles in length which would be determined by an analysis during the design phase of the overall invention. The interrupter breaker would be required in the event of a foreign object having electrical conductivity dropping into the trench and contacting both rails 206 and 207, simultaneously, or by temporary shorting during a flash flood. The power interruption would trigger automatic retraction of blade 410 during collision with the foreign object. The electric car 106 would then continue under battery power until joining the next segment where charging could be resumed.

Figure 12:
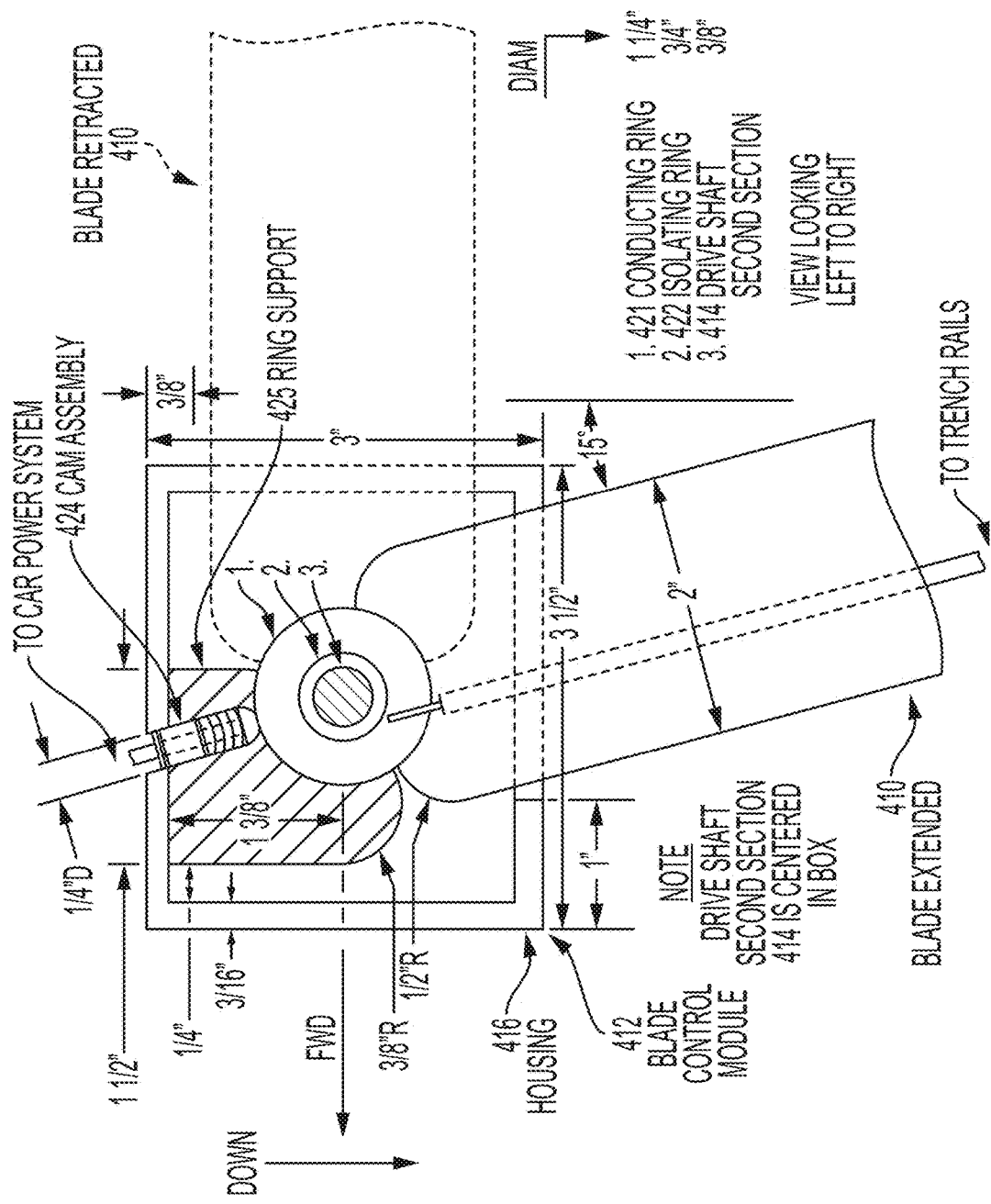
FIG. 12 depicts a side view of the power transfer method.

Shown in FIG. 12 is a side view, looking left to right, of blade control module 412. Of particular note is the method of transferring power from the retractable transfer power blade 410 to electric vehicle power system 106.

The transfer point must be able to accommodate rotary motion of the blade firmly attached to the drive shaft second section 414 as it rotates the blade 410 up and down during normal and contingency conditions. This accommodation is provided by a pair of interfacing parts: conducting ring 421 and cam assembly 424.

As depicted in FIG. 12, conducting ring 421, isolating ring 422, and retractable power transfer blade 410 are all integral with drive shaft second section 414 and rotate with it. Inside blade 410 depicted in FIG. 12 is a lead wire carrying current from one of the power rails 206 or 207 in the trench 104 to one of the two conductive rings 421. Two conducting rings 421 are required; one for the power lead and one for the return lead.

As the conducting ring 421 rotates, it brushes against the conducting tip of the cam assembly 424. Constant contact pressure between the conducting tip and the circumference of the conductive ring 421 is provided by a coil spring inside the 1/4-inch diameter tube forming the outside of the cam assembly 424, which is firmly attached within ring support 425. This ring support 425 is made of a non-conducting material and is attached to the inside of the upper section of housing 416. As part of cam assembly 424, washers are affixed to the inside of the cam assembly tube to provide stability for the lead wire attached to the conducting tip of the cam assembly. The lower one of the two washers provides the reacting surface for the coil spring. The lead is routed to the electric vehicle 106 power system.

Whenever retractable power transfer blade 410 is rotated clear of the rails 206 and 207 in the trench 104, there is no current to be transferred across this described power transfer system.

Figure 13:
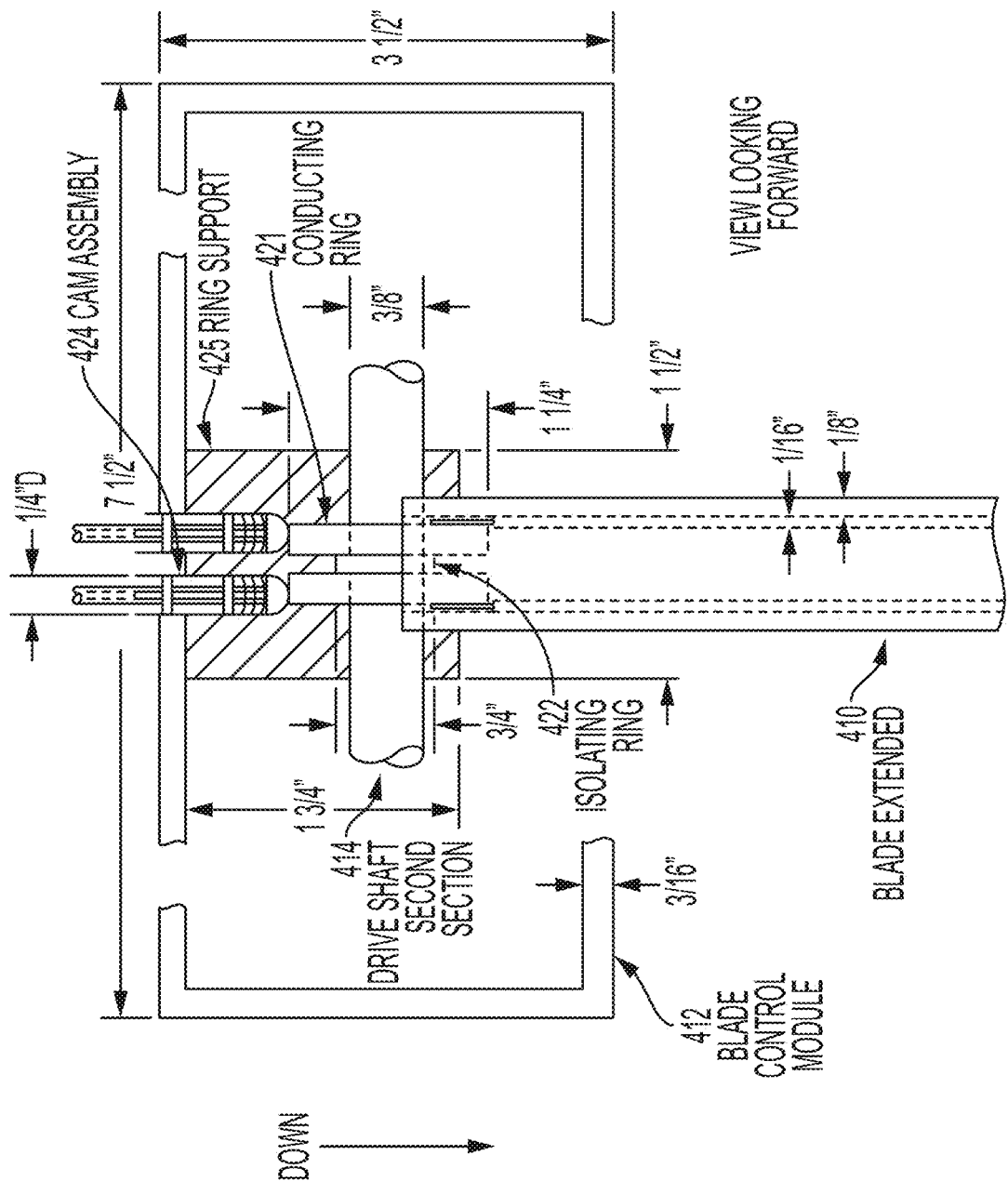
FIG. 13 depicts a front view of the power transfer method.

Shown in FIG. 13 is a forward looking view of the blade control module 412. Of particular note is the method of transferring power from the retractable power transfer blade 410 to electric vehicle 106 power system. This method has been described in the description of FIG. 12. FIG. 13 specifically depicts this method in a third dimension and provides additional detail of the method.

With reference to FIG. 13, the two parallel paths for current flow are depicted, one for power transfer, and one for return transfer. Each lead wire is shown as it is routed inside the blade 410 carrying current from its associated power rail 206 or return rail 207 (See FIG. 3). The upper end of each lead wire is attached to its respective conductive ring 421. The outer edge of each conducting ring 421 brushes against the conducting tip of its corresponding cam assembly 424. This enables two separate current paths, one for power transfer, and one for return transfer. An isolating ring 422, made of a non-conducting material is mounted between the two conducting rings 421 to provide electrical isolation.

Figure 14:
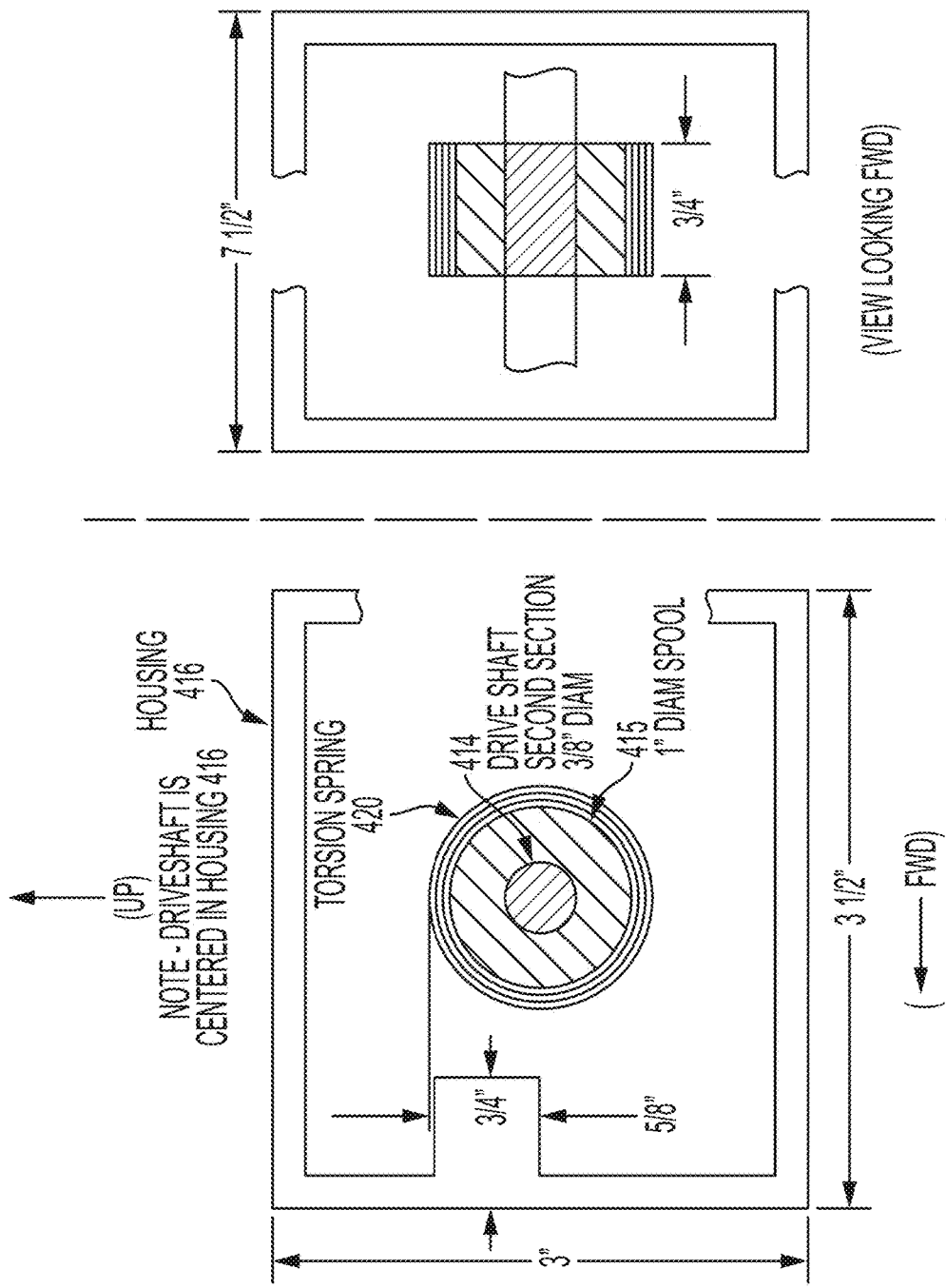
FIG. 14 depicts detailed views of the torsion spring.

FIG. 14 provides additional detail of torsion spring 420 depicted in FIG. 4. Torsion spring 420 is comprised of spring steel tightly wound around 1" diameter spool 415, and is critical to the rapid retraction of blade 410 during power failure as previously described in the description of FIG. 4. The free end of torsion spring 420 is firmly attached to a small shelf which is integrated to housing 416, and which reacts to the tension in torsion spring 420.

The invention claimed is:

1. A charging system for an electric vehicle comprising:
    a charging trench in a roadway, wherein the charging trench comprises:
        a first insulated sidewall;
        a second insulated sidewall opposite the first insulated sidewall;
        a trench base at a bottom of the charging trench coupled to the first insulated sidewall and the second insulated sidewall;
        a blade guidance rail seat in a center of the trench base;
        a first power rail coupled to the first insulated sidewall; and
        a second power rail coupled to the second insulated sidewall; and
    a deployable charger coupled to the electrical vehicle, the deployable charger comprising:
        a power transfer blade configured to rotate between a retracted position and a charging position in the charging trench;
        wherein the power transfer blade comprises:
            an insulated tip;
            a first electric contact located on a first side of the power transfer blade; and
            a second electric contact located on a second side of the power transfer blade; and
        a blade control module having a drive motor for rotating the power transfer blade between the retracted position and the charging position,
        wherein the first electric contact engages the first power rail and the second electric contact engages the second power rail when the power transfer blade is in the charging position for providing power to a car battery of the electric vehicle.

2. The charging system according to claim 1, wherein the insulated tip engages the blade guidance rail when the power transfer blade is in the charging position.

3. The charging system according to claim 2, wherein the blade guidance rail seat is U-shaped or V-shaped.

4. The charging system according to claim 1, wherein the blade control module further comprises:
    a torsion spring for holding the power transfer blade in the retracted position,
    wherein the drive motor overcomes the torsional force of the torsion spring to rotate the power transfer blade into the charging position.

5. The charging system according to claim 4, further comprising:
    a clutch assembly for engaging and disengaging the drive motor with the power transfer blade,
    wherein disengagement of the drive motor from the power transfer blade by the clutch assembly causes immediate retraction of the power transfer blade by the torsion spring.

6. The charging system according to claim 1, further comprising:
    a blade lateral motion absorber comprising:
        a first rod support having ends mounted to a chassis of the electric vehicle;
        a second rod support having ends mounted to the chassis,
        wherein the first rod support is parallel to the second rod support;
        a pair of parallel slider rods having first ends coupled to the first rod support and second ends coupled to the second rod support;
        a carrier module slidably positioned over the parallel slider rods between the first rod support and the second rod support; and
        a plurality of motion absorbing springs positioned on the pair of parallel slider rods to center carrier module on the pair of parallel slider rods while also allowing transverse displacement of the carrier module,
    wherein the blade control module is coupled to the carrier module.

7. The charging system according to claim 6, wherein the blade lateral motion absorber further comprises:
    a first load cell and a second load cell for measuring the transverse displacement loads of the carrier module,
    wherein the blade control module automatically retracts the power charging blade if the transverse displacement exceeds a predetermined threshold.

8. The charging system according to claim 1, wherein a top surface of the charging trench comprises a plurality of magnetic markers, and wherein the blade control module comprises a magnetic sensor for detecting the plurality of magnetic markers.

9. The charging system according to claim 8, wherein the blade control module rotates the power transfer blade to the charging position when the magnetic sensor detects the plurality of magnetic markers.

10. The charging system according to claim 1, wherein the power control blade is angled rearward 65-85° with respect to the charging trench when the power control blade is in the charging position.

11. The charging system according to claim 1, wherein the power control blade is angled approximately 75° with respect to the charging trench when the power control blade is in the charging position.

12. The charging system according to claim 1, further comprising:

a blade control panel in an interior of the vehicle coupled to the blade control module, wherein the blade control panel comprises a switch for rotating the power control blade from the retracted position to the charging position.

13. The charging system according to claim 12, wherein the blade control panel comprises a plurality of indicators for indicating a current statue of the blade control module.

14. The charging system according to claim 13, further comprising:

a camera coupled to the blade control module for capturing video of the charging trench and the power control blade.

15. The charging system according to claim 14, wherein the video is shown superimposed on a windshield of the electric vehicle to allow a driver to align the power control blade with the charging trench before deployment of the power control blade.

16. The charging system according to claim 1, further comprising:

a ground fault interrupt circuit coupled to a positive power rail to cut power if a short is detected.

* * * * *